Nov. 4, 1941.  J. WELLER  2,261,316
TENSIONING DEVICE FOR TRANSMISSION CHAINS
Filed July 9, 1940  2 Sheets-Sheet 1
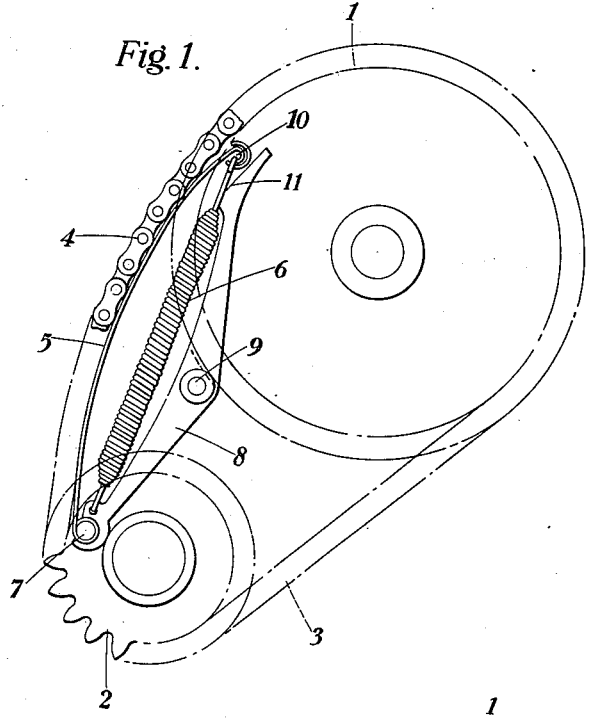
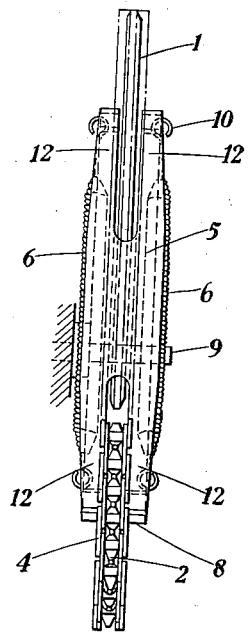
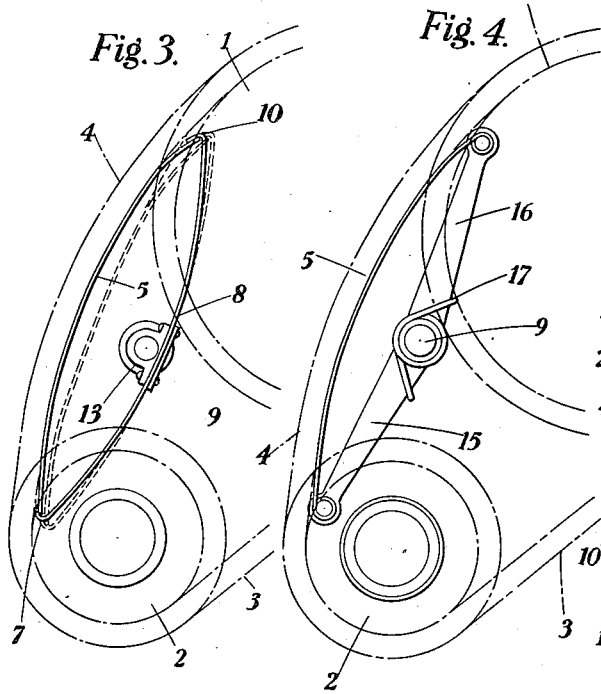
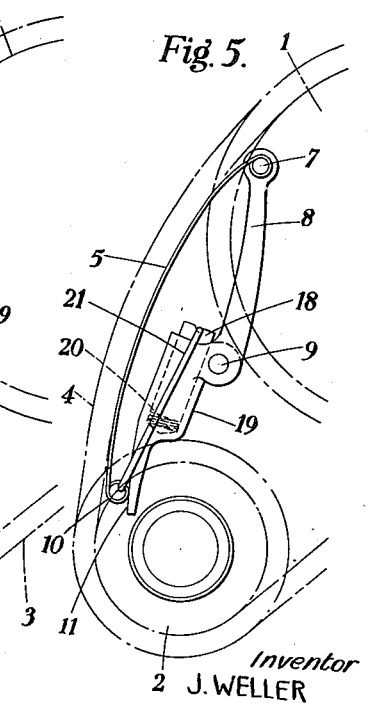
Inventor
J. WELLER
by Blair & Kilcoyne
Attorneys Nov. 4, 1941.  J. WELLER  2,261,316
TENSIONING DEVICE FOR TRANSMISSION CHAINS
Filed July 9, 1940  2 Sheets-Sheet 2
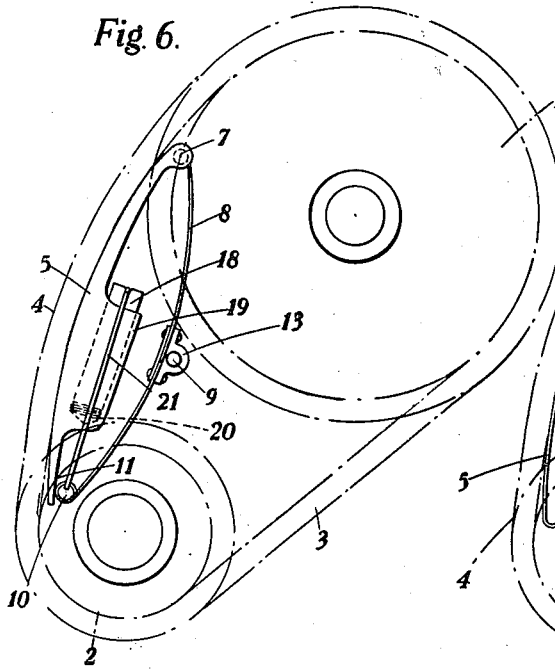
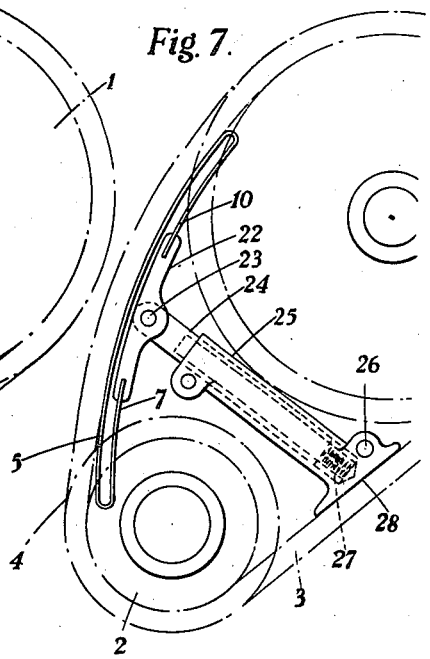
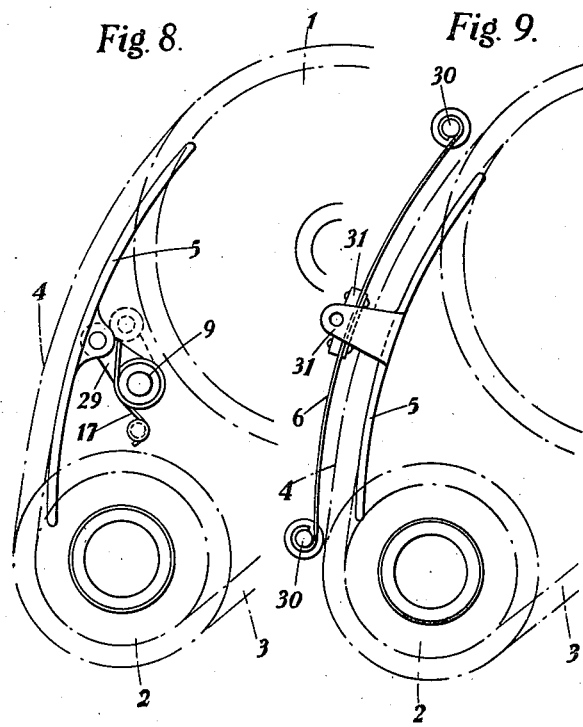
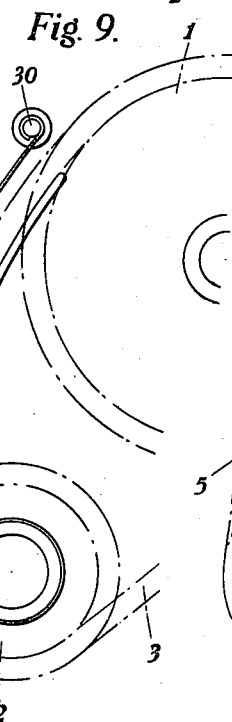
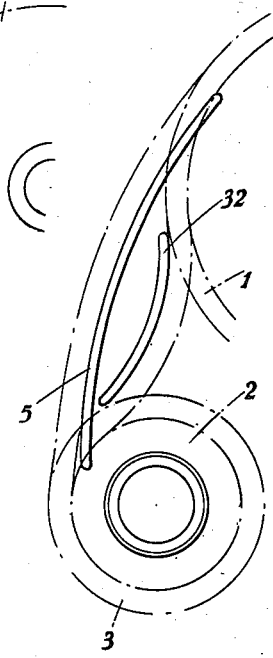
Inventor
J. WELLER
by Blair & Kilcoyne
Attorneys Patented Nov. 4, 1941

2,261,316

UNITED STATES PATENT OFFICE 2,261,316

TENSIONING DEVICE FOR TRANSMISSION CHAINS

John Weller, Dorking, England

Application July 9, 1940, Serial No. 344,586
In Great Britain February 17, 1939

3 Claims. (Cl. 74—242.11)

This invention relates to tensioning devices for transmission chains of the kind in which the slack is taken up by pressing against the chain a slipper which conforms to the curvature of the chain.

It is usual for the slipper to act on the outside of the chain, that is to say, to urge the chain towards its sprockets in just the same way as the roller acts in the more usual loaded or "jockey" roller type of tensioner.

The pressure between the chain and the slipper is relatively high. It appears probable to me from experience gained in designing and testing tensioning devices over a number of years that this high pressure has to be exerted because there is a centrifugal effect on the chain which has to be overcome before the slipper can take up any slack in the chain. The length of the slipper is limited to that of the free length of chain between successive sprockets and may, in some cases, be very short indeed. It will be seen, therefore, that the pressure between the slipper and the chain may be so high as to cause these elements to become worn quite rapidly.

According to the invention, the slipper of a tensioner of the kind described above is arranged so as to act not on the outside but on the inside of the chain so as to urge the chain away from its sprockets. No part of the force with which the slipper is urged towards the chain has, in that case, to be expended in overcoming the centrifugal effect referred to above and, therefore, for a given amount of slack in the chain, the pressure between the slipper and the chain can be much lower than it would be were the slipper to act on the outside of the chain. It is undoubtedly the case that when the chain follows a convex path between the sprockets, a centrifugal force acts on it which tends to force the chain outwards and which, of course, adds itself to the thrust of the slipper so as to increase the tensioning force wihout increasing the pressure between the slipper and the chain. A longer slipper can be used where the invention is put into effect than where the slipper is made to act on the outside of the chain. Thus, it will be appreciated that a chain can be used, the side plates of which lie beyond the side faces of the sprockets and the slipper can be bifurcated near its ends so as to enable it to bear against the edges of the side plates of the chain right up to the points where the chain is in full engagement with the teeth of the sprockets. The greater the length of the slipper, the smaller will be the pressure between it and the chain. If the same expedient were adopted with a slipper bearing against the outside of the chain, the slipper could, of course, be lengthened, but to no purpose, because the extent of useful movement of the slipper would be unduly limited.

Where a flexible slipper is used, the arrangement in accordance with the invention has the further advantage that the degree of curvature of the slipper for a given amount of slack in the chain is substantially less than when the slipper acts on the outside of the chain.

A few examples of arrangements in accordance with the invention will now be described with reference to the accompanying drawings, in which Figure 1 shows semi-diagrammatically one form of tensioner in accordance with the invention acting on a chain passing round a pair of sprockets, Figure 2 is a side elevation of Figure 1 with the chain shown partly broken away for the sake of clearness, Figures 3–9 are views similar to Figure 1 showing modified forms of construction in accordance with the invention, and Figure 10 is a diagram showing the advantage of the invention over the normal kind of slipper tensioner.

In all the figures of the drawings similar references have been used to indicate similar parts.

In Figure 1 there are two sprockets 1, 2 carrying a driving chain 3. The slack side 4 of the chain is tensioned by a slipper 5 which is held pressed against it by a pair of tension springs 6.

The slipper 5 is in the form of a leaf spring which is hinged at the lower end 7 to a rigid member 8 mounted on a pivot pin 9 which is carried by a fixed part (not shown) such as a casing which surrounds the sprockets and the chain. The upper end 10 of the slipper rests on a guide surface 11 formed on the member 8. This end and the end 7 are bifurcated as shown in Figure 2, so that the slipper can extend beyond the points where the chain finally leaves and first reaches the sprockets 1, 2. The two branches 12 formed by the bifurcation of the end 10 of the slipper are connected to the lower end of the member 8 by means of the springs 6. The rigid member 8 is of course bifurcated at its ends so as to straddle the sprockets.

It is clear that with this arrangement the springs 6 always tend to increase the curvature of the slipper and thus force the chain 4 away from the sprockets and effectively take up any slack in the chain. The substantial length over which the chain is in contact with the slipper is to be noted.

It is not essential to provide the springs 6 such as are shown here. Instead, the slipper 5 could be permanently bowed to a curvature somewhat greater than that shown in Figure 1 so that it kept the chain tensioned by its own resilience and its tendency to regain its normal bowed shape.

The arrangement shown in Figure 3 differs essentially from that shown in Figure 1 in that the member 8 on which the slipper 5 is mounted is flexible instead of being rigid. Here, the member 8 is in the form of a leaf spring attached to a block 13 pivotally mounted on the pin 9. The slipper 5 is hinged to the member 8 at its two ends. Both the slipper 5 and the member 8 are permanently bowed, but in its normal condition, the distance between the ends of the slipper is greater than the distance between the ends of the member 8. As the tendency which one of these members has to straighten out is resisted by the similar tendency which the other has, this arrangement leads to an approximately constant tensioning force being applied to the chain throughout the extent of movement of the slipper. It will also be appreciated that the distance through which the central part of the slipper moves away from the pivot point 9 is large relatively to the distance through which the ends 7 and 10 move as is indicated by the dotted lines in Figure 3.

As in the case of Figure 1, the slipper 5 is bifurcated at its ends so as to increase the length over which it can be brought into contact with the chain. The spring 8 is, of course, also bifurcated at its ends.

In the arrangement shown in Figure 4, a flexible slipper 5 is again used. It is anchored at each of its ends to the outer ends of a pair of levers 15, 16 mounted on the pivot pin 9. These levers are urged towards each other by a torsion spring 17 so that there is a constant tendency for the slipper to have its curvature increased. The slipper 5, as in the cases of Figures 1 and 3, is bifurcated at its two ends. The levers 15, 16 are also bifurcated at their ends. The spring 17 can be dispensed with if the leaf spring 5 forming the slipper is sufficiently strong.

The variant shown in Figure 5 is in many respects similar to that shown in Figure 1. A flexible slipper 5 is used which is anchored at one end 7 to the member 8 which itself is pivotally mounted on the pin 9. The end 10 also slides on a surface 11 formed on the member 8 as in the case of Figure 1. The sliding of the end, however, is controlled by a piston 18 arranged in a cylinder 19 and pressed outwards by a spring 20 and connected to the end 10 of the slipper by means of a stirrup link 21. The arrangement 18, 20 constitutes an hydraulic dashpot which is preferably provided with a limited return device such as is described in my British Patent No. 484,128. The ends of the slipper and of the member 8 are bifurcated as in the forms of construction previously described.

The arrangement shown in Figure 6 is an inversion of that shown in Figure 5 in that the functions of the parts 5 and 8 have been reversed. The member 8 here is in the form of a leaf spring carried by a block 13 pivotally mounted on the pin 9 while the slipper 5 is rigid and is provided at one end with a dashpot connection 18—21 of the kind shown in Figure 5.

In the arrangement shown in Figure 7, the slipper 5 is in the form of a leaf spring the ends 7 and 10 of which are returned upon themselves and are attached to a block 22 pivotally mounted on a pin 23 at the end of a plunger 24 which slides in a cylinder 25. The cylinder 25 is fixed to a fixed part such as a casing in which the sprockets and the chain are mounted by means of bolts 26. The plunger 24 is loaded by a spring 27 which tends to push it, the block 22 and the slipper 5 towards the chain. The lower end of the cylinder 25 has a flat surface 28 over which the tight side of the chain 3 passes. The surface acts as a steady pad to check oscillations in the chain. The ends 7 and 10 of the slipper are bifurcated.

In the arrangement shown in Figure 8 the slipper 5 is of rigid construction and is pivotally mounted on one end of a link 29 which is itself mounted on the pivot pin 9. A torsion spring 17 is provided which tends to turn the link 29 counterclockwise and thus to force the slipper 5 into contact with the chain. It is to be noted that as the link 29 turns from the position shown in dotted lines to that shown in full lines, the force exerted by the spring 17 will decrease. At the same time, however, the mechanical advantage of the arrangement will increase and in that way a more or less constant tensioning effort is produced. The ends of the slipper 5 are, of course, bifurcated.

In the arrangement shown in Figure 9, there is a slipper 5 of rigid construction which is constantly urged towards the chain 3 by means of a leaf spring 6. This spring is anchored at its two ends to pins 30 carried by a fixed part such as the casing of the device. It is provided at its centre with a block 31 to which are pivotally attached two lugs 32 fixed to the slipper 5. It will be noted that in this arrangement the slipper 5 and the member 6 which presses it towards the chain are on opposite sides of the chain. The ends of the slipper are, again, bifurcated.

Figure 10 shows the advantages which are to be obtained by the use of the invention. The reference numeral 32 indicates a slipper of the normal kind which is pressed against the outside of the chain. It can be seen at a glance that this slipper must necessarily be relatively short where, as is frequently the case, the two sprockets 1, 2 are only a short distance apart. The slipper 32 cannot be effectively lengthened because if it were made longer by adopting the expedient of bifurcating its ends, the lengthening would merely have the effect of pressing the chain against the sprockets without taking up any further slack in the length of chain between the sprockets. If, however, the slipper is placed inside the chain as is shown at 5, a very much longer slipper can be used. As shown here, the slipper 5 is bifurcated at its ends (see Figure 2) so that it acts on the chain also where the chain is still in contact with the sprockets. A very long bearing surface is thus provided. Even if the ends of the slipper are not bifurcated, a longer bearing surface can be obtained than in the case in which the slipper bears on the outside of the chain. The amount of slack taken up by the slipper 32 and by the slipper 5 is the same and it will be seen that the curvature of the slipper 32 is very much greater than that of the slipper 5. This is a point of quite substantial importance where a flexible slipper is used.

I claim:

1. In combination, a pair of sprockets, a driving chain engaging with said sprockets and having side plates which lie outside the side faces of said sprockets, and a tensioner including a slipper making contact with the edges of said side plates over the free length of chain between said sprockets and also over lengths of the chain which are engaged by said sprocket.

2. In combination, a driving chain, a pair of sprockets engaging with said chain, and a tensioner including a slipper bifurcated at its ends, thereby to engage the chain throughout substantially its entire length between said sprockets.

3. In combination, a driving chain having side plates, a pair of sprockets for said chain, and a tensioner comprising a pair of leaf springs of different lengths connected together at their ends, one of said springs constituting a slipper engaging the inside of said chain between the normal points of tangency of the chain and sprockets so as to urge said chain away from said sprockets, and the other of said springs constituting means for urging said slipper into contact with the chain.

JOHN WELLER.